June 2, 1953  J. R. ROSENLEAF  2,640,371
DRIVE FOR ADJUSTABLE-AXIS MATING ROTORS
Filed March 1, 1951

INVENTOR.
John R. Rosenleaf,
BY:
Harold B. Hood.
ATTORNEY.

Patented June 2, 1953

2,640,371

UNITED STATES PATENT OFFICE 2,640,371

DRIVE FOR ADJUSTABLE-AXIS MATING ROTORS

John R. Rosenleaf, Enterprise, Kans., assignor to The J. B. Ehrsam & Sons Manufacturing Co., Enterprise, Kans., a corporation of Kansas Original application January 3, 1948, Serial No. 459. Divided and this application March 1, 1951, Serial No. 213,337

6 Claims. (Cl. 74—397)

The present application is a division of my copending application Serial Number 459, filed January 3, 1948, for "Rotary Lath Punch," and is primarily concerned with means for maintaining synchronism between two rotors, mounted on parallel axes and respectively carrying gears which are normally meshed, during periods while, as a result of relative adjustment of the rotor axes, said gears are separated from intermeshing relation. The invention herein disclosed and claimed finds its primary utility in a machine for cutting, punching, imprinting or otherwise acting upon a continuously-flowing stream of material, such, for instance, as that disclosed in the patent to Emmett D. Benham and John R. Rosenleaf No. 2,228,162 issued January 7, 1941; but it is not limited to such use.

The primary object of the present invention, of course, is to provide mechanism which will effectively maintain such synchronism under such conditions, such mechanism to be simple in structure, sturdy, and accurate in operation, and singularly free from liability to disorders.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figures 1, 2:
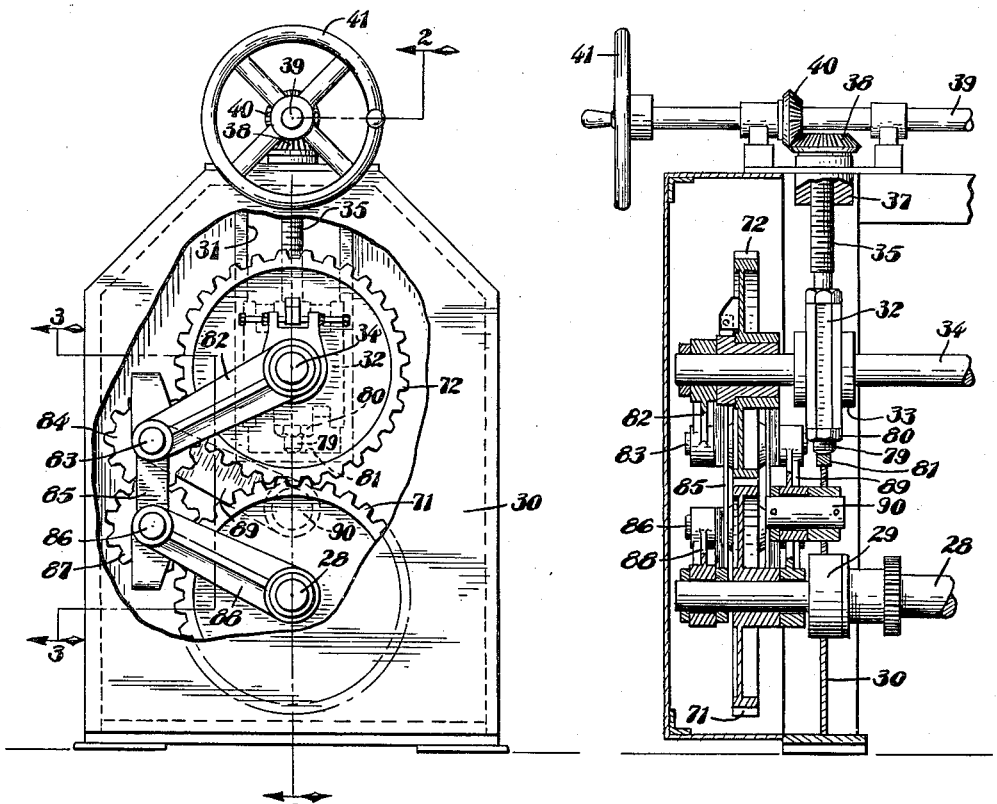
Fig. 1 is an end elevation of a machine embodying my present invention.
Fig. 2 is a vertical section taken substantially on the line 2—2 of Fig. 1.
Figure 3:
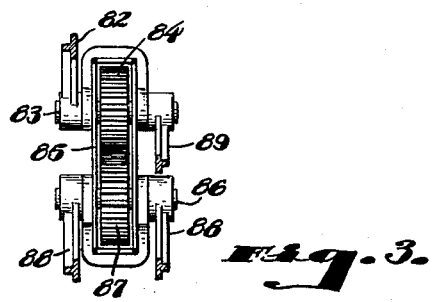
Fig. 3 is an elevational view, parts being broken away for clarity of illustration, taken upon a plane parallel to the plane of Fig. 2 and showing an assembly comprising an important part of my invention.

Referring more particularly to the drawings, it will be seen that I have illustrated one of two end panels 30 of a frame in which are journalled the opposite ends of a shaft or rotor 28, bearings, such as 29, preferably being provided for supporting said rotor ends in said panels. Each end panel 30 is provided, in a region above the bearings 29, with a vertically extending trackway 31 in which is slidably mounted a shoe 32, each such shoe carrying a bearing 33, in which bearings are journalled the opposite ends of a second shaft 34, parallel with, and substantially coextensive with, the shaft 28. To the upper end of each shoe 32 is suitably secured a rod 35, threaded at its upper end for cooperation with a nut 37 journalled for rotation, but held against reciprocation, in a suitable support on the frame panel 30. Fixed to, or integral with, each nut 37, is a beveled gear 38, and a shaft 39 spans the region between said gears 38 and carries two beveled gears 40, each meshing with one of said gears 38. Two handwheels 41, one at each end of the machine, are mounted upon the shaft 39 for rotating the same; and it will be obvious that rotation of the shaft 39 in one direction or the other will elevate or depress the shoes 32, correspondingly shifting the shaft 34 which is journalled in said shoes.

At its illustrated end, the shaft or rotor 28 carries a large spur gear 71; and, at its corresponding end, the shaft 34 carries a similar gear 72 which, when the parts are in the positions illustrated, meshes with the gear 71 to provide a driving connection between the shafts 28 and 34, whereby said shafts will be turned at equal velocities in opposite directions. The gear 71 is suitably fixed to the shaft 28, while the gear 72 is loosely mounted upon the shaft 34, the driving connection between said gear 72 and such shaft 34 being provided by suitable means for effecting accurate relative rotational adjustment of the attitude of said gear upon its shaft. This adjusting means forms no part of the present invention and therefore will not be herein described in detail.

In a machine of the character of that disclosed and claimed in my said copending application, it is essential that the rotor 34 be raised, at times, to prevent or modify the coaction of parts respectively carried by the rotors 28 and 34. It is likewise essential that the two rotors be maintained always in accurate registry. Since elevation of the shaft 34 to a degree sufficient to prevent such coaction will inevitably disengage the meshing teeth of the gears 71 and 72, some means must be provided for maintaining that registry during such disengagement. Likewise, I have provided means for positively limiting downward movement of the shaft 34, in order that the gears 71 and 72 may not become jammed. Such limiting means preferably comprises a screw 79, adjustably received in a cooperating socket in the lower edge of the shoe 32, a lock nut 80 on said screw for holding the screw in any desired position of adjustment, and a fixed abutment 81, rigid with the machine frame, and engageable by the screw 79, upon downward movement of the shoe, to limit such downward movement.

A link 82 has one end journalled on a projection of the shaft 34, the other end of said link supporting an axle 83 upon which is fixed a spur gear 84. The link length is such as to hold the gear 84 always in mesh with the gear 72.

A frame 85, which may comprise merely a pair of straps, engages the axle 83 and another axle 86 upon which is mounted a gear 87 whose pitch diameter is identical with the gear 84, the frame 85 holding the two axles 83 and 86 in such a relation that the gears 84 and 87 are always intermeshed. One end of a link 88 engages the axle 86, and the other end of said link is journalled upon the shaft 28, the length of the link 88 being such as to hold the gear 87 always in mesh with the gear 71. As shown, I provide two links 88, one engaging each end of the axle 86. A trunnion element 90 is supported in the frame panel 30 and provides a journal mounting for one end of a link 89, the other end of said link 89 being engaged with the axle 83. The axis of the trunnion element 90 lies in the plane defined by the axes of the shafts 28 and 34, and the trunnion element 90 is spaced above the fixed axis of the shaft 28 a distance equal to the distance between the axes of the axles 83 and 86, so that the links 88 and 89 are always parallel.

As is clearly to be seen from an examination of Fig. 1, the link 82 is inclined downwardly toward the plane midway between the axes of the shafts 34 and 28 and perpendicular to the plane defined by said axes, while the link 88 is inclined upwardly toward said plane, and the link 89 intersects said plane. When the shaft 34 is shifted upwardly from its position illustrated in Fig. 1, the link 82 will move in a counter-clockwise direction and the links 88 and 89 will move in a clockwise direction, the plane including the axes of the axles 83 and 86 being maintained always parallel with the plane including the axes of the shafts 28 and 34, and the gears 84 and 87 being held always in mesh, respectively, with the gears 72 and 71. Since the gears 84 and 87 are further held always in mesh with each other, it will be clear that, in spite of the disengagement of the teeth of the gear 72 from the teeth of the gear 71, the gear 72 will continue to be driven in absolute correlation with the gear 71. Thus, when the parts are again returned to the positions of Fig. 1, the gears 71 and 72 will move into mesh smoothly, and without disturbing the rotational relationship between the rotors 28 and 34 and such elements as are carried thereon.

I claim as my invention:

1. In a device of the class described, a pair of rotors, bearing means for each of said rotors mounting said rotors for rotation upon spaced parallel axes, means for shifting the bearing means for one of said rotors toward and away from the bearing means for the other of said rotors, a gear rotatable with each of said rotors, gear means providing an operative connection between said gears throughout shifting movement of said first-named bearing means and comprising two intermeshing idler gears mounted on parallel axes, said idler gears respectively meshing with the gears on said rotors, and means retaining the axes of said idler gears always in a common plane parallel with the plane common to the axes of said rotors, said last-named means including a link connecting the axis of one of said rotors with the axis of one of said idler gears, a second link connecting the axis of the other of said rotors with the axis of the other of said idler gears, and a third link connecting the axis of one of said idler gears with a fixed axis in the plane common to said rotor axes.

2. In a device of the class described, a pair of rotors, bearing means for each of said rotors mounting said rotors for rotation upon spaced parallel axes, means for shifting the bearing means for one of said rotors toward and away from the bearing means for the other of said rotors, a gear rotatable with each of said rotors, an axle, an idler gear on said axle, a link oscillable about the axis of one of said rotors and connected to said axle to hold said idler gear enmeshed with the gear rotatable with said one rotor, a second axle, a second idler gear on said second axle, means maintaining said second axle parallel with, and at a fixed distance from, said first axle with said idler gears in mesh with each other, a second link oscillatable about the axis of the other of said rotors and connected to said second axle to hold said second idler gear enmeshed with the gear rotatable with said other rotor, and a third link mounted for oscillation about an axis parallel with and intermediate the axes of said rotors and connected to said first axle.

3. In a device of the class described, a pair of rotors, bearing means for each of said rotors mounting said rotors for rotation upon spaced parallel axes, means for shifting the bearing means for one of said rotors, upon a line joining said axes, toward and away from the bearing means for the other of said rotors, a gear rotatable with each of said rotors, an axle, an idler gear on said axle, a link journalled at one end for oscillation about the axis of said one rotor and inclined toward the plane located midway between said axes and normal to said line, said link being connected to said axle to hold said idler gear in mesh with said gear rotatable with said one rotor, a second axle, a second idler gear on said second axle, means maintaining said second axle at a fixed distance from said first axle with said idler gears in mesh with each other, a second link journalled at one end for oscillation about the axis of the other of said rotors and inclined toward said plane, said second link being connected to said second axle to hold said second idler gear in mesh with said gear rotatable with said other rotor, and a third link journalled upon an axis located between said plane and one of said rotor axes, said third link angularly traversing said plane and being connected, on the other side of said plane, with one of said axles.

4. The organization of claim 3 in which said third link is arranged in substantial parallism with, and is equal in length to, that previously mentioned link which is connected with the other of said axles, whereby the line joining said axles is held normal to said plane.

5. The organization of claim 4 in which the journal axis of said third link is located between said plane and the axis of the non-shiftable rotor.

6. In a device of the class described, a pair of rotors, bearing means for each of said rotors mounting said rotors for rotation upon spaced parallel axes, a gear fixed to one of said rotors, a gear fixed to the other of said rotors and adapted to mesh with said first-named gear, means for shifting the bearing means for said one rotor toward and away from the axis of said other rotor to move said gears into and out of mesh, and means for maintaining synchronism of said rotors while said gears are out of mesh, including a frame, a pair of intermeshing idler gears carried by said frame on parallel axes, one of said idler gears meshing with one of said rotor gears and the other idler gear meshing with the other rotor gear, and a linkage mechanism including elements pivotally connected with said frame upon the axes of said idler gears, respectively, said elements also having pivotal connections at three other points, two only of said other points being located upon said rotor axes, respectively.

J. R. ROSENLEAF.

References Cited in the file of this patent

UNITED STATES PATENTS

| Number | Name | Date |
| --- | --- | --- |
| 64,932 | Amidon | May 21, 1867 |
| 2,141,101 | Webster | Dec. 20, 1938 |

FOREIGN PATENTS

| Number | Country | Date |
| --- | --- | --- |
| 581,850 | France | Dec. 6, 1924 |
| 152,859 | Germany | Apr. 11, 1917 |